(12) United States Patent
Miyaguchi

(10) Patent No.: US 12,417,884 B2
(45) Date of Patent: *Sep. 16, 2025

(54) ELECTROCHEMICAL CAPACITOR

(71) Applicant: Panasonic Intellectual Property Management Co., Ltd., Osaka (JP)

(72) Inventor: Nao Miyaguchi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 50 days.

This patent is subject to a terminal disclaimer.

(21) Appl. No.: 18/547,155

(22) PCT Filed: Mar. 17, 2022

(86) PCT No.: PCT/JP2022/012119
§ 371 (c)(1),
(2) Date: Aug. 19, 2023

(87) PCT Pub. No.: WO2022/196746
PCT Pub. Date: Sep. 22, 2022

(65) Prior Publication Data
US 2024/0128031 A1 Apr. 18, 2024

(30) Foreign Application Priority Data
Mar. 19, 2021 (JP) .................. 2021-046509

(51) Int. Cl.
H01G 11/30 (2013.01)
H01G 11/62 (2013.01)

(52) U.S. Cl.
CPC ............. *H01G 11/30* (2013.01); *H01G 11/62* (2013.01)

(58) Field of Classification Search
CPC ........ H01G 11/26; H01G 11/48; H01G 11/60; H01G 11/62; H01G 11/00; H01G 11/32; Y02E 60/13
See application file for complete search history.

(56) References Cited

U.S. PATENT DOCUMENTS 9,218,912 B2 * 12/2015 Doi ........................ H01G 9/028
11,521,804 B2 * 12/2022 Yan ........................ H01G 11/52
12,166,206 B2 * 12/2024 Kako ..................... H01G 11/06
(Continued)

FOREIGN PATENT DOCUMENTS

JP 10-270293 10/1998
JP 2000286161 A * 10/2000 ............. H01G 11/04
(Continued)

OTHER PUBLICATIONS

International Search Report of PCT application No. PCT/JP2022/012119 dated May 31, 2022.

*Primary Examiner* — Dion R. Ferguson
(74) *Attorney, Agent, or Firm* — Rimon P.C.

(57) ABSTRACT

An electrochemical capacitor includes: a positive electrode; a negative electrode; a separator disposed between the positive electrode and the negative electrode; and an electrolytic solution. The electrolytic solution contains a lactone compound. A capacity of the positive electrode is greater than the capacity of the negative electrode and is less than or equal to 1.6 times the capacity of the negative electrode.

8 Claims, 2 Drawing Sheets

(56) References Cited

U.S. PATENT DOCUMENTS

| | | | |
|---|---|---|---|
| 2013/0095368 A1* | 4/2013 | Birke | H01M 10/625 |
| | | | 429/163 |
| 2014/0002960 A1* | 1/2014 | Tezuka | H01G 11/70 |
| | | | 361/508 |
| 2014/0036413 A1* | 2/2014 | Hagiwara | H01G 11/28 |
| | | | 361/508 |
| 2015/0188128 A1* | 7/2015 | Robinson | H01M 4/1391 |
| | | | 429/231.8 |
| 2016/0156017 A1* | 6/2016 | Zaghib | H01M 4/0404 |
| | | | 429/188 |
| 2016/0300666 A1* | 10/2016 | Kamijo | H01G 11/62 |
| 2017/0330700 A1 | 11/2017 | Tokumaru et al. | |
| 2018/0211794 A1* | 7/2018 | Brambilla | H01G 11/52 |
| 2019/0272961 A1* | 9/2019 | Voller | H01G 11/58 |
| 2021/0296645 A1* | 9/2021 | Kako | H01M 10/425 |
| 2022/0052312 A1* | 2/2022 | Tsuzuki | H01M 4/13 |
| 2022/0344659 A1* | 10/2022 | Oura | H01M 4/364 |
| 2022/0376227 A1* | 11/2022 | Kuroda | H01M 4/5825 |
| 2024/0128031 A1* | 4/2024 | Miyaguchi | H01G 11/58 |
| 2024/0194421 A1* | 6/2024 | Miyaguchi | H01G 11/00 |

FOREIGN PATENT DOCUMENTS

| | | |
|---|---|---|
| JP | 2019-102712 | 6/2019 |
| JP | 2020-136487 | 8/2020 |
| KR | 20120129569 A * | 11/2012 |
| WO | 2016/092664 | 6/2016 |

\* cited by examiner

ELECTROCHEMICAL CAPACITOR

TECHNICAL FIELD

The present invention relates to an electrochemical capacitor.

BACKGROUND

An electrochemical capacitor includes a pair of electrodes and an electrolytic solution, and at least one of the pair of electrodes contains an active material capable of adsorbing and desorbing ions. An electric double layer capacitor, which is an example of an electrochemical capacitor, has a longer life than a secondary battery, can be rapidly charged, has excellent output characteristics, and is widely used as a backup power supply or the like.

International Publication WO 2016/092664 describes, as a nonaqueous electrolytic solution for an electric double layer capacitor, an example in which N-ethyl-N-methylpyrrolidinium tetrafluoroborate is dissolved as a quaternary ammonium salt, and 28.3 ppm of $K^+$ and 0.4 ppm of $Na^+$ are contained as alkali metal cations (Example 1).

SUMMARY

The electrochemical capacitor is likely to deteriorate in performance under float charge, and further improvement is required.

In view of the above, one aspect of the present invention relates to an electrochemical capacitor including: a positive electrode; a negative electrode; a separator disposed between the positive electrode and the negative electrode; and an electrolytic solution. The electrolytic solution contains a lactone compound, and a capacity of the positive electrode is greater than a capacity of the negative electrode and is less than or equal to 1.6 times the capacity of the negative electrode.

According to the present invention, deterioration of float characteristics of an electrochemical capacitor can be suppressed.

DESCRIPTION OF EMBODIMENT

[Electrochemical Capacitor]

Figure 1:
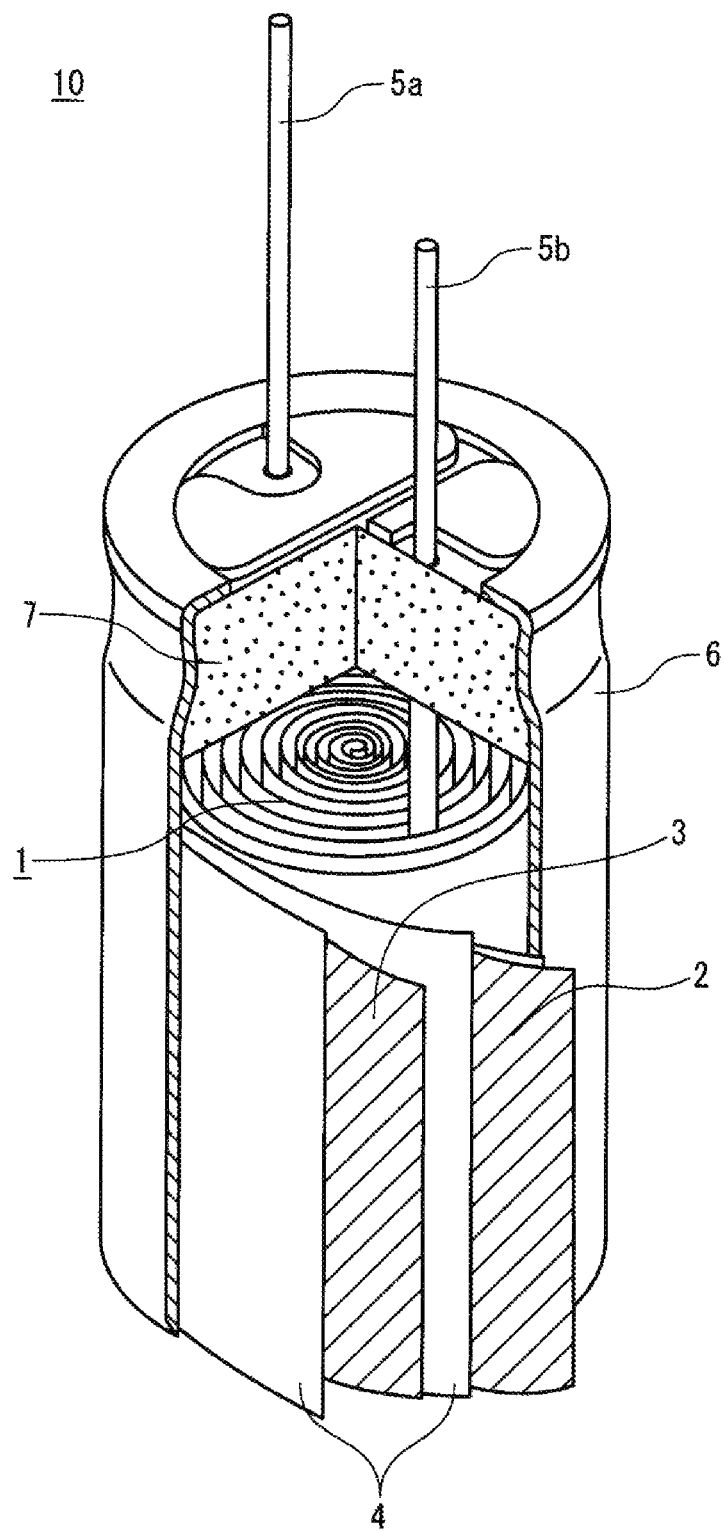
FIG. 1 is a partially cutout perspective view illustrating an electrochemical capacitor according to an exemplary embodiment of the present invention.

An electrochemical capacitor according to an exemplary embodiment of the present invention includes: a positive electrode; a negative electrode; a separator disposed between the positive electrode and the negative electrode; and an electrolytic solution. The electrolytic solution contains a lactone compound. a capacity of the positive electrode is greater than a capacity of the negative electrode and is less than or equal to 1.6 times the capacity of the negative electrode. This configuration can improve float characteristics.

Note that the float characteristics are an index of the degree of deterioration of the electrochemical capacitor when float charge maintaining a constant voltage is performed with an external DC power supply. It can be said that a small decrease in capacitance and a small increase in internal resistance at the time of float charge indicate better float characteristics.

Here, the capacity of the positive electrode is the maximum value of the capacity that can be developed in the positive electrode, and is a theoretical capacity determined according to the amount of the positive electrode active material and the like. Similarly, the capacity of the negative electrode is the maximum value of the capacity that can be developed in the negative electrode, and is a theoretical capacity determined according to the amount of the negative electrode active material and the like. The capacity of the positive electrode is generally a value obtained by multiplying the facing area ($cm^2$) between the positive electrode and the negative electrode by the loading amount ($g/cm^2$) of the positive electrode active material per unit area and the capacity (F/g) of the positive electrode active material per unit weight. The capacity of the negative electrode is generally a value obtained by multiplying the facing area ($cm^2$) between the positive electrode and the negative electrode by the loading amount ($g/cm^2$) of the negative electrode active material per unit area and the capacity (F/g) of the negative electrode active material per unit weight. The capacities (F) of the positive electrode active material and the negative electrode active material are determined from the amount of charged electricity or the amount of stored charge when 3 V is applied to the electrochemical capacitor.

In the electrochemical capacitor, as the capacity of the positive electrode is greater than the capacity of the negative electrode, the potentials of the positive electrode and the negative electrode decrease. Further, as the capacity of the negative electrode is greater than the capacity of the positive electrode, the potentials of the positive electrode and the negative electrode increase.

The lactone compound, which has low viscosity even at low temperatures, is used as a solvent of the electrolytic solution in the electrochemical capacitor. Examples of the lactone compound include β-propiolactone, γ-butyrolactone, γ-valerolactone, and δ-valerolactone. Among them, γ-butyrolactone (GBL) is most preferable in that the viscosity is small even at low temperatures, the boiling point is high, and the amount of gas released by side reaction is small.

However, when the potential of the positive electrode is high, the lactone compound may be decomposed by being placed in a strongly oxidizing environment. In float charge, a high voltage is continuously applied to the electrochemical capacitor for a long period of time. Thus, a state in which the potential of the positive electrode is high continues for a long period of time, and the lactone compound is easily subjected to oxidative decomposition. As a result, it is considered that the float characteristics are deteriorated.

On the other hand, with the electrochemical capacitor according to an exemplary embodiment of the present invention, the potential of the positive electrode at the time of charge can be lowered by making the capacity of the positive electrode greater than the capacity of the negative electrode. As a result, oxidative decomposition of the lactone compound is suppressed, so that deterioration of float characteristics can be suppressed.

As the capacity of the positive electrode is greater than the capacity of the negative electrode, the effect of suppressing oxidative decomposition of the lactone compound is enhanced, and the effect of suppressing deterioration of float characteristics is enhanced. The capacity of the positive electrode is preferably more than or equal to 1.1 times the capacity of the negative electrode from the viewpoint of suppressing deterioration of float characteristics.

Meanwhile, as the capacity of the positive electrode is increased with respect to the capacity of the negative electrode, a portion that does not contribute to the capacitance of the electrochemical capacitor increases in the capacity of the positive electrode, and the capacitance of the electrochemical capacitor decreases. In addition, the potential of the negative electrode decreases, so that the reducibility is further increased on the negative electrode side. The capacity of the positive electrode is less than or equal to 1.6 times the capacity of the negative electrode from the viewpoint of suppressing a decrease in the capacitance of the electrochemical capacitor and suppressing a side reaction due to reductive decomposition in the negative electrode.

The capacity of the positive electrode is desirably more than or equal to 1.1 times and less than or equal to 1.6 times the capacity of the negative electrode from the viewpoint that the capacitance of the electrochemical capacitor can be maintained high while deterioration of float characteristics is suppressed.

The positive electrode of the electrochemical capacitor may be a polarizable electrode. The polarizable electrode may contain an active material capable of adsorbing and desorbing ions. In the electrochemical capacitor, at least in the positive electrode, ions are adsorbed to the active material to develop the capacitance. When ions are desorbed from the active material, a non-faradaic current flows. The negative electrode may be a polarizable electrode or a non-polarizable electrode.

When both the positive electrode and the negative electrode are polarizable electrodes, the electrochemical capacitor may be an electric double layer capacitor (EDLC) in which an electric double layer is formed by adsorption of ions to the active material. When the negative electrode is a non-polarizable electrode, the electrochemical capacitor may be a lithium ion capacitor (LIC) that develops the capacitance by adsorption or desorption of lithium ions in the negative electrode. In the case of the LIC, a negative electrode used in a lithium ion secondary battery may be used as the negative electrode. In an electrochemical capacitor including a wound electrode assembly, the electrode assembly usually has a structure in which the outermost periphery thereof is a negative electrode.

The polarizable electrode includes, for example, a current collector, and a polarizable electrode layer supported on the current collector. When both the positive electrode and the negative electrode are polarizable electrodes, the positive electrode includes, for example, a positive current collector, and a polarizable electrode layer supported on the positive current collector. The negative electrode includes, for example, a negative current collector, and a polarizable electrode layer supported on the negative current collector. The capacity of each of the positive electrode and the negative electrode depends on the loading amount of the active material contained in the polarizable electrode layer, and also depends on, for example, the specific surface area of the active material when the capacitance is developed by adsorption of ions to the active material. However, the capacity of the positive electrode can be easily made greater than the capacity of the negative electrode by making the thickness of the polarizable electrode layer of the positive electrode greater than the thickness of the polarizable electrode layer of the negative electrode.

Further, the capacity of the positive electrode may be made greater than the capacity of the negative electrode by compressing the polarizable electrode layer of the positive electrode to increase the loading density of the active material per supported area of the polarizable electrode layer supported on the positive current collector while the thicknesses of the positive electrode and the negative electrode are made substantially the same.

When both the positive electrode and the negative electrode are polarizable electrodes, a thickness of the polarizable electrode layer of the positive electrode is preferably greater than the thickness of the polarizable electrode layer of the negative electrode, and is preferably less than or equal to 1.6 times the thickness of the polarizable electrode layer of the negative electrode. The thickness of the polarizable electrode layer of the positive electrode is more preferably more than or equal to 1.1 times and less than or equal to 1.6 times the thickness of the polarizable electrode layer of the negative electrode.

By making the capacity of the positive electrode greater than the capacity of the negative electrode, the potential of the negative electrode also decreases at the time of float charge while the potential of the positive electrode decreases, and the environment of the negative electrode is brought into an environment with higher reducibility. As a result, the material (for example, a binding agent or the like contained in the active material layer) contained in the negative electrode is subjected to reductive decomposition, so that the characteristics of the electrochemical capacitor may be deteriorated. Hence, when the positive electrode and/or the negative electrode contains a binding agent, the binding agent preferably has high reduction resistance. Examples of the binding agent having high reduction resistance include styrene-butadiene rubber (SBR). The styrene-butadiene rubber (SBR) includes a styrene-butadiene copolymer and a modified product thereof.

When both the positive electrode and the negative electrode include a polarizable electrode layer, the styrene-butadiene rubber is preferably contained in at least the polarizable electrode layer of the negative electrode.

As ions (cations) contained in the electrolytic solution, quaternary ammonium ions are preferably used. The electrolytic solution may contain pyrrolidinium ions. The pyrrolidinium ion has high reduction resistance and is hardly decomposed in the negative electrode. Hence, even when the capacity of the positive electrode is greater than the capacity of the negative electrode, and the reducibility of the negative electrode is further increased, the pyrrolidinium ion is stable, and generation of gas due to decomposition in the negative electrode is suppressed. Thus, deterioration of float characteristics can be further suppressed.

The pyrrolidinium ion is represented by $C_4H_8N^+$—$R_1R_2$ ($R_1$ and $R_2$ are each a hydrocarbon group), and is a quaternary ammonium ion in which the nitrogen of the pyrrolidine ring is quaternized. $R_1$ and $R_2$ may each independently be a C1 to C4 alkyl group. Examples of the pyrrolidinium ion include N,N-dimethylpyrrolidinium (DMPy), N-methyl-N-ethylpyrrolidinium (MEPy), and N,N-diethylpyrrolidinium (DEPy).

The quaternary ammonium ions are added to the electrolytic solution in the form of a salt with an anion. The anion is preferably an anion containing fluorine. The salt preferably contains a fluorine-containing acid anion. Examples of the anion containing fluorine include $BF_4^-$ and $PF_6^-$.

When the electrochemical capacitor is charged by applying a voltage of 3 V between the positive electrode and the negative electrode, a potential of the positive electrode preferably is more than or equal to +0.86 V and less than or equal to +0.96 V (a potential of the negative electrode is more than or equal to −2.14 V and less than or equal to −2.04 V) with respect to the potential of an Ag/Ag$^+$ reference electrode. In this case, it is possible to realize an electrochemical capacitor in which deterioration of float characteristics is remarkably suppressed.

The potential of the positive electrode (negative electrode) is determined by immersing the positive electrode and the negative electrode after charge at 3 V in a non-aqueous solution having the same composition as that of the electrolytic solution such that the active material layers (polarizable electrode layers) of the electrodes face each other, and measuring the potential of the positive electrode when the negative electrode (positive electrode) is used as a counter electrode and the Ag electrode is used as a reference electrode. When the positive electrode and the negative electrode have active material layers (polarizable electrode layers) on both surfaces thereof, one surface of the active material layer (polarizable electrode layer) is removed so as not to form a portion in which the active material layers do not face each other. The Ag electrode that can be used is one prepared by adding a solvent (GBL) to an electrolytic solution so that the salt concentration is 0.1 mol/L and further adding AgBF$_4$ so that the Ag$^+$ ion concentration is 0.1 mol/L, to thereby obtain an internal solution for a reference electrode, filling a glass tube with the obtained internal solution for a reference electrode, and immersing a silver wire in the internal solution for a reference electrode.

Hereinafter, each constituent element of the electrochemical capacitor according to an exemplary embodiment of the present invention will be described in more detail by taking an electric double layer capacitor as an example.

(Positive Electrode and Negative Electrode)

As the positive electrode and/or the negative electrode of the electrochemical capacitor, for example, an electrode including: an active layer (polarizable electrode layer) containing an active material; and a current collector supporting the active layer is used as a polarizable electrode. The active material contains, for example, porous carbon particles. The active layer contains, as an essential component, porous carbon particles which are an active material, and may contain a binding agent, a conductive agent, and the like as optional components.

The porous carbon particles can be produced, for example, by subjecting a raw material to a heat treatment to carbonize the raw material, and subjecting the obtained carbide to an activation treatment to obtain the porous particles. The carbide may be crushed and sized before the activation treatment. The porous carbon particles obtained by the activation treatment may be subjected to a pulverization treatment. After the pulverization treatment, a classification treatment may be performed. Examples of the activation treatment include gas activation using a gas such as water vapor, and chemical activation using an alkali such as potassium hydroxide.

Examples of the raw material include wood, coconut shell, pulp waste liquid, coal or coal-based pitch obtained through thermal decomposition of coal, heavy oil or petroleum-based pitch obtained through thermal decomposition of heavy oil, phenol resin, petroleum-based coke, and coal-based coke. Among them, the raw material is preferably petroleum-based coke or coal-based coke.

The petroleum-based coke or the coal-based coke may be subjected to a heat treatment, the obtained carbide may be subjected to an activation treatment to obtain porous carbon particles, and then the porous carbon particles may be subjected to a pulverization treatment. For the pulverization treatment, for example, a ball mill or a jet mill is used. Fine porous carbon particles are obtained through the pulverization treatment, and the average particle diameter (D50) thereof is, for example, from 1 μm to 4 μm, inclusive. In the present specification, the average particle diameter (D50) means a particle diameter (median diameter) at which the volume integrated value is 50% in the volume-based particle size distribution measured by the laser diffraction/scattering method.

The pore distribution and particle size distribution of the porous carbon particles can be adjusted by, for example, the raw material, the heat treatment temperature, the activation temperature in gas activation, and the degree of pulverization. Further, the pore distribution and the particle size distribution of the porous carbon particles may be adjusted by mixing two types of porous carbon particles made of different raw materials. The average particle diameter and particle size distribution of the porous carbon particles are measured by a laser diffraction/scattering method. As the measuring apparatus, for example, a laser diffraction/scattering particle diameter distribution measuring apparatus "MT 3300 EXII" manufactured by MicrotracBEL Corp. is used.

As the binding agent, for example, a resin material such as polytetrafluoroethylene (PTFE), carboxymethyl cellulose (CMC), and styrene-butadiene rubber (SBR) are used. As the conductive agent, for example, carbon black such as acetylene black is used.

The electrode is obtained, for example, by applying a slurry containing porous carbon particles, a binding agent, and/or a conductive agent, and a dispersion medium to a surface of a current collector, drying the coating film, followed by rolling, to thereby form an active layer. As the current collector, for example, a metal foil such as an aluminum foil is used.

When the electrochemical capacitor is an electric double layer capacitor (EDLC), an electrode containing the porous carbon particles can be used for at least one of the positive electrode and the negative electrode. When the electrochemical capacitor is a lithium ion capacitor (LIC), an electrode containing the porous carbon particles can be used for the positive electrode, and a negative electrode used in a lithium ion secondary battery can be used as the negative electrode. The negative electrode used in a lithium ion secondary battery contains, for example, a negative electrode active material (for example, graphite) capable of absorbing and releasing lithium ions.

(Electrolytic Solution)

The electrolytic solution contains a solvent (non-aqueous solvent) and an ionic substance. The ionic substance is dissolved in the solvent and contains a cation and an anion. The ionic substance may contain, for example, a low melting point compound (ionic liquid) that can exist as a liquid at around normal temperature. The concentration of the ionic substance in the electrolytic solution is, for example, more than or equal to 0.5 mol/L and less than or equal to 2.0 mol/L.

The solvent preferably has a high boiling point. The solvent contains a lactone compound, and other solvents as necessary. Examples of the other solvent that can be used include cyclic carbonates such as ethylene carbonate, propylene carbonate, and butylene carbonate; chain carbonates such as dimethyl carbonate, diethyl carbonate, and ethyl methyl carbonate; aliphatic carboxylic acid esters such as methyl formate, methyl acetate, methyl propionate, and ethyl propionate; polyhydric alcohols such as ethylene glycol and propylene glycol; cyclic sulfones such as sulfolane; amides such as N-methylacetamide, N,N-dimethylformamide, and N-methyl-2-pyrrolidone; ethers such as 1,4-dioxane; ketones such as methyl ethyl ketone; and formaldehyde.

The ionic substance contains, for example, an organic salt. The organic salt is a salt in which at least one of an anion and a cation contains an organic substance. Examples of the organic salt in which a cation contains an organic substance include quaternary ammonium salts. Examples of the organic salt in which an anion (or both ions) contain(s) an organic substance include trimethylamine maleate, triethylamine borodisalicylate, ethyldimethylamine phthalate, mono-1,2,3,4-tetramethylimidazolinium phthalate, and mono-1,3-dimethyl-2-ethylimidazolinium phthalate.

From the viewpoint of improving the withstand voltage characteristics, the anion preferably includes a fluorine-containing acid anion. Examples of the fluorine-containing acid anion include $BF_4^-$ and/or $PF_6^-$. The organic salt preferably contains, for example, a pyrrolidinium cation and a fluorine-containing acid anion. Specific examples thereof include N,N-dimethylpyrrolidinium tetrafluoroborate ($DMPyBF_4$), N-methyl-N-ethylpyrrolidinium tetrafluoroborate ($MEPyBF_4$), and N,N-diethylpyrrolidinium tetrafluoroborate ($DEPyBF_4$).

(Separator)

A separator is usually interposed between the positive electrode and the negative electrode. The separator has ion permeability and has a role of physically separating the positive electrode and the negative electrode to prevent a short circuit. As the separator, a nonwoven fabric made of cellulose fiber, a nonwoven fabric made of glass fiber, a microporous film, woven fabric, or nonwoven fabric made of polyolefin, or the like may be used. The separator has a thickness, for example, from 8 μm to 300 μm, inclusive, preferably from 8 μm to 40 μm, inclusive.

Hereinafter, an electrochemical capacitor according to an exemplary embodiment of the present invention will be described with reference to FIG. 1. FIG. 1 is a partially cutout perspective view of an electrochemical capacitor according to an exemplary embodiment of the present invention. The present invention is not limited to the electrochemical capacitor of FIG. 1.

Electrochemical capacitor 10 in FIG. 1 is an electric double layer capacitor, and includes capacitor element 1 which is a wound capacitor element. Capacitor element 1 has a structure in which sheet-like first electrode (positive electrode) 2 and sheet-like second electrode (negative electrode) 3 are wound with separator 4 interposed therebetween. First electrode 2 and second electrode 3 have a first current collector and a second current collector made of metal, respectively, and a first active layer and a second active layer supported on surfaces of the first current collector and the second current collector, respectively, and develop the capacitance by adsorbing and desorbing ions. The first active layer and the second active layer contain, for example, porous carbon particles.

For example, an aluminum foil is used as the current collector. The surface of the current collector may be roughened by a method such as etching. As separator 4, for example, a nonwoven fabric containing cellulose as a main component is used. First lead wire 5a and second lead wire 5b are connected as lead-out members to first electrode 2 and second electrode 3, respectively. Capacitor element 1 is housed in cylindrical outer case 6 together with an electrolytic solution (not shown). The material of outer case 6 may be, for example, metal such as aluminum, stainless steel, copper, iron, or brass. The opening of outer case 6 is sealed with sealing member 7. Lead wires 5a and 5b are led out to the outside to penetrate sealing member 7. For sealing member 7, for example, a rubber material such as butyl rubber is used.

In the above exemplary embodiment, the wound capacitor has been described, but the application range of the present invention is not limited to the above, and the present invention can also be applied to a capacitor having another structure, for example, a stacked capacitor or a coin capacitor.

Hereinafter, the present invention will be described in more detail based on examples, but the present invention is not limited to the examples.

Examples 1 to 9 and Comparative Examples 1 to 9

In this example, a wound electric double layer capacitor was produced as an electrochemical capacitor. Hereinafter, a specific method for producing the electrochemical capacitor will be described.

(Production of Electrode)

Porous carbon particles (88 parts by mass) as an active material, polytetrafluoroethylene (PTFE) (6 parts by mass) as a binding agent, and acetylene black (6 parts by mass) as a conductive agent were dispersed in water to prepare a slurry. The obtained slurry was applied to an Al foil (thickness: 30 μm), and the coating film was hot-air dried at 110° C. and rolled to form an active layer (polarizable electrode layer) having a thickness shown in Table 1, thereby obtaining a positive electrode and a negative electrode. The capacity of the positive electrode and the capacity of the negative electrode are proportional to the thickness of the active layer.

(Preparation of Electrolytic Solution)

A pyrrolidinium salt was dissolved in γ-butyrolactone (GBL), which is a lactone compound, as a non-aqueous solvent to prepare an electrolytic solution. The concentration of the pyrrolidinium salt in the electrolytic solution was 1.0 mol/L. As the pyrrolidinium salt, a salt of a pyrrolidinium cation and a tetrafluoroborate anion ($BF_4$) shown in Table 1 was used.

(Production of Electrochemical Capacitor)

As a separator, a microporous film made of polypropylene (PP) was prepared. A lead wire was connected to each of the positive electrode and the negative electrode, and the positive electrode and the negative electrode were wound with a nonwoven fabric separator made of cellulose interposed therebetween, to thereby obtain a capacitor element. The capacitor element was housed in a predetermined outer case together with an electrolytic solution, and the case was sealed with a sealing member to complete an electrochemical capacitor (electric double layer capacitor). Thereafter, an aging treatment was performed at 60° C. for 16 hours while a rated voltage was applied to the electrochemical capacitor.

Each electrochemical capacitor obtained as described above was evaluated as follows.

[Evaluation]

(1) Evaluation of Float Characteristics (Measurement of Initial Capacitance and Initial Internal Resistance (DCR))

In an environment of −30° C., constant current charge was performed at a current of 2,700 mA until the voltage reached 3 V, and then a state in which a voltage of 3 V was applied was maintained for 7 minutes. Thereafter, constant current discharge was performed at a current of 20 mA in an environment of −30° C. until the voltage reached 0 V.

A time t (sec) required for the voltage to drop from 2.16 V to 1.08 V in the discharge was measured. Using measured time t, a capacitance (initial capacitance) C1 (F) of the electrochemical capacitor before the float test was determined from Formula (1) below.

$$\text{Capacitance } C1 = Id \times t/V \quad (1)$$

In Formula (1), Id is a current value (0.02 A) at the time of discharge, and V is a value (1.08 V) obtained by subtracting 1.08 V from 2.16 V.

Using a discharge curve (vertical axis: discharge voltage, horizontal axis: discharge time) obtained by the above discharge, a linear approximate line of the discharge curve in the range from 0.5 seconds to 2 seconds after the start of discharge was obtained, and a voltage VS of the intercept of the linear approximate line was determined. A value (V0−VS) obtained by subtracting voltage VS from voltage V0 at the start of discharge (when 0 second has elapsed from the start of discharge) was obtained as ΔV. Using ΔV (V) and the current value Id (0.02 A) at the time of discharge, an internal resistance (DCR) R1 (Ω) of the electrochemical capacitor before the float test was determined from Formula (2) below.

$$\text{Internal resistance } R1 = \Delta V/Id \quad (2)$$

(Measurement of Capacitance and Internal Resistance (DCR) after Float Test)

In an environment of 65° C., constant current charge was performed at a current of 1,000 mA until the voltage reached 3 V, and then a voltage of 3.0 V was held for 200 hours. In this way, the electrochemical capacitor was stored in a state where a voltage of 3.0 V was applied thereto. Thereafter, constant current discharge was performed at a current of 1,000 mA in an environment of 65° C. until the voltage reached 0 V. Thereafter, the electrochemical capacitor was charged and discharged in an environment of −30° C. in the same manner as in the measurement of the initial capacitance and initial internal resistance. Then, a capacitance C2 (F) and an internal resistance R2 (Ω) after the float test of the electrochemical capacitor were determined.

Using the capacitance C1 and the capacitance C2 before and after the float test of the electrochemical capacitor obtained as described above, the capacitance deterioration rate was evaluated from the following formula. A smaller absolute value of capacitance deterioration rate indicates that a decrease in capacitance after the float test is suppressed.

$$\text{Capacitance deterioration rate } (\%) = ((C2/C1) - 1) \times 100$$

Using the internal resistance R1 and the internal resistance R2 before and after the float test of the electrochemical capacitor obtained as described above, the resistance increase rate was determined from the following formula. A smaller increase rate indicates that an increase in internal resistance after the float test is suppressed.

$$\text{Resistance increase rate } (\%) = (R2/R1) \times 100$$

(2) Measurement of Potentials of Positive Electrode and Negative Electrode

The produced electrochemical capacitor was disassembled, and the positive electrode, the negative electrode, and the separator were taken out. One surface of the polarizable electrode layer formed on both surfaces of each of the taken out positive electrode and negative electrode was peeled off, and punched out to a diameter of 16 mm. The taken out separator was punched to a diameter of 24 mm. The punched positive electrode, the punched negative electrode, and the punched separator were stacked so that the polarizable electrode layers faced each other with the separator interposed therebetween, to thereby assemble an evaluation cell. The evaluation cell was immersed in a nonaqueous solution having the same composition as that of the electrolytic solution of the electrochemical capacitor. Then, the Ag electrode prepared by the above-described method was disposed as a reference electrode.

The evaluation cell was charged at a constant current of 1.8 mA in an environment of 25° C. until the voltage reached 3 V. Thereafter, a state in which a voltage of 3.0 V is applied was held for 10 minutes. The potentials of the positive electrode and the negative electrode after a voltage of 3.0 V was held for 10 minutes were measured.

A plurality of electrochemical capacitors were produced and evaluated while the cation of the pyrrolidinium salt contained in the electrolytic solution, the thickness of the active layer in the positive electrode, and the thickness of the active layer in the negative electrode were changed. The results of the evaluation are shown in Table 1. The electrochemical capacitors of Examples 1 to 9 are electrochemical capacitors A1 to A9 in Table 1. The electrochemical capacitors of Comparative Examples 1 to 9 are electrochemical capacitors B1 to B9 in Table 1. Table 1 also shows the binding agent used for each electrochemical capacitor, the thickness (μm) of the active layer in each of the positive electrode and the negative electrode, and the thickness ratio Rd. In Table 1, DMPy, MEPy, and DEPy are an N,N-dimethylpyrrolidinium cation, an N-methyl-N-ethylpyrrolidinium cation, and an N,N-diethylpyrrolidinium cation, respectively.

In electrochemical capacitors A1 to A9 and B1 to B9, the density of the active layer was the same in the positive electrode and the negative electrode, and was the same among the electrochemical capacitors. Therefore, the ratio Rd of the thickness of the active layer in the positive electrode to the thickness of the active layer in the negative electrode is substantially equal to the ratio of the capacity of the positive electrode to the capacity of the negative electrode.

In electrochemical capacitors A1 to A9 and B3, B6, B9, the active layer in the positive electrode has a thickness greater than the thickness of the active layer in the negative electrode, and Rd>1. In this case, the capacitance of the electrochemical capacitor is regulated by the capacity of the negative electrode (the thickness of the active layer in the negative electrode). On the other hand, in electrochemical capacitors B1, B4, and B7, the active layer in the positive electrode has a thickness smaller than the thickness of the active layer in the negative electrode, and Rd<1. In this case, the capacitance of the electrochemical capacitor is regulated by the capacity of the positive electrode (the thickness of the active layer in the positive electrode).

Examples 10 to 12 and Comparative Examples 10 to 12

In the preparation of the electrolytic solution, diethyldimethylammonium tetrafluoroborate (DEDMABF$_4$) was dissolved in γ-butyrolactone (GBL) in place of the pyrrolidinium salt to prepare an electrolytic solution. The concentration of DEDMABF$_4$ in the electrolytic solution was 1.0 mol/L.

An electrochemical capacitor was produced and evaluated in the same manner as in Example 1 except for the above.

A plurality of electrochemical capacitors were produced and evaluated while the thickness of the active layer in the positive electrode and the thickness of the active layer in the negative electrode were changed. The results are shown in Table 2. The electrochemical capacitors of Examples 10 to 12 are electrochemical capacitors A10 to A12 in Table 2. The electrochemical capacitors of Comparative Examples 10 to 12 are electrochemical capacitors B10 to B12 in Table 2. Table 2 also shows the binding agent used in each electrochemical capacitor, the thickness (μm) of the active layer in each of the positive electrode and the negative electrode, and the thickness ratio Rd. In Table 2, DEDMA is a diethyldimethylammonium cation.

In electrochemical capacitors A10 to A12 and B10 to B12, the density of the active layer was the same in the positive electrode and the negative electrode, and was the same among the electrochemical capacitors. Therefore, the ratio Rd of the thickness of the active layer in the positive electrode to the thickness of the active layer in the negative electrode is substantially equal to the ratio of the capacity of the positive electrode to the capacity of the negative electrode.

In electrochemical capacitors A10 to A12 and B12, the active layer in the positive electrode has a thickness greater than the thickness of the active layer in the negative electrode, and Rd>1. In this case, the capacitance of the electrochemical capacitor is regulated by the capacity of the negative electrode (the thickness of the active layer in the negative electrode). On the other hand, in electrochemical capacitor B10, the active layer in the positive electrode has a thickness smaller than the thickness of the active layer in the negative electrode, and Rd<1. In this case, the capacitance of the electrochemical capacitor is regulated by the capacity of the positive electrode (the thickness of the active layer in the positive electrode).

TABLE 1

| Electrochemical capacitor | Cation contained in electrolytic solution | Active layer thickness (μm) | | Thickness ratio Rd | Positive electrode potential (V) (vs Ag/Ag$^+$) | Negative electrode potential (V) (vs Ag/Ag$^+$) | Float characteristics | |
|---|---|---|---|---|---|---|---|---|
| | | Positive electrode | Negative electrode | | | | Resistance increase rate (%) | Capacitance deterioration rate (%) |
| B1 | DMPy | 59 | 65 | 0.9 | 1.02 | −1.98 | 438 | −48 |
| B2 | DMPy | 65 | 65 | 1 | 0.99 | −2.01 | 286 | −39 |
| A1 | DMPy | 65 | 59 | 1.1 | 0.95 | −2.05 | 190 | −23 |
| A2 | DMPy | 65 | 43 | 1.5 | 0.88 | −2.12 | 160 | −18 |
| A3 | DMPy | 65 | 41 | 1.6 | 0.86 | −2.14 | 162 | −19 |
| B3 | DMPy | 65 | 38 | 1.7 | 0.84 | −2.16 | 228 | −43 |
| B4 | MEPy | 59 | 65 | 0.9 | 1.03 | −1.97 | 439 | −51 |
| B5 | MEPy | 65 | 65 | 1 | 0.99 | −2.01 | 300 | −42 |
| A4 | MEPy | 65 | 59 | 1.1 | 0.96 | −2.04 | 194 | −24 |
| A5 | MEPy | 65 | 43 | 1.5 | 0.88 | −2.12 | 162 | −20 |
| A6 | MEPy | 65 | 41 | 1.6 | 0.86 | −2.14 | 177 | −20 |
| B6 | MEPy | 65 | 38 | 1.7 | 0.84 | −2.16 | 234 | −42 |
| B7 | DEPy | 59 | 65 | 0.9 | 1.02 | −1.98 | 448 | −52 |
| B8 | DEPy | 65 | 65 | 1 | 0.98 | −2.02 | 296 | −42 |
| A7 | DEPy | 65 | 59 | 1.1 | 0.96 | −2.04 | 196 | −25 |
| A8 | DEPy | 65 | 43 | 1.5 | 0.89 | −2.11 | 163 | −20 |
| A9 | DEPy | 65 | 41 | 1.6 | 0.86 | −2.14 | 178 | −20 |
| B9 | DEPy | 65 | 38 | 1.7 | 0.85 | −2.15 | 235 | −43 |

TABLE 2

| Electrochemical capacitor | Cation contained in electrolytic solution | Active layer thickness (μm) | | Thickness ratio Rd | Positive electrode potential (V) (vs Ag/Ag$^+$) | Negative electrode potential (V) (vs Ag/Ag$^+$) | Float characteristics | |
|---|---|---|---|---|---|---|---|---|
| | | Positive electrode | Negative electrode | | | | Resistance increase rate (%) | Capacitance deterioration rate (%) |
| B10 | DEDMA | 59 | 65 | 0.9 | 1.02 | −1.98 | 440 | −48 |
| B11 | DEDMA | 65 | 65 | 1 | 1.01 | −1.99 | 298 | −42 |
| A10 | DEDMA | 65 | 59 | 1.1 | 0.988 | −2.012 | 218 | −31 |
| A11 | DEDMA | 65 | 43 | 1.5 | 0.96 | −2.04 | 191 | −23 |
| A12 | DEDMA | 65 | 41 | 1.6 | 0.96 | −2.04 | 196 | −24 |
| B12 | DEDMA | 65 | 38 | 1.7 | 0.95 | −2.05 | 230 | −44 |

As shown in Tables 1 and 2, in electrochemical capacitors A1 to A9 in which the ratio Rd of the thickness of the active layer in the positive electrode to the thickness of the active layer in the negative electrode (the ratio of the capacity of the positive electrode to the capacity of the negative electrode) was more than 1 and less than or equal to 1.6, deterioration of float characteristics could be suppressed.

Tables 1 and 2 show that as the thickness ratio Rd increases, the positive electrode potential and the negative electrode potential decrease. Accordingly, when Rd is in the range of more than 1 and less than or equal to 1.6, oxidative decomposition of the lactone compound in the positive electrode is suppressed, the resistance increase rate and the capacitance deterioration rate are small, and high float characteristics are maintained. On the other hand, when Rd exceeds 1.6, the absolute values of the resistance increase rate and the capacitance deterioration rate increase. The reason for this is considered to be that the constituent material of the negative electrode, the solute of the electrolytic solution, or the like is easily subjected to reductive decomposition due to a decrease in the negative electrode potential.

Table 1 shows that in electrochemical capacitors A1 to A9 and B1 to B9 using pyrrolidinium ions as cations contained in the electrolytic solution, the positive electrode potential and the negative electrode potential decrease when the thickness ratio Rd is increased, as compared with electrochemical capacitors A10 to A12 and B10 to B12 using DEDMA shown in Table 2. Accordingly, in electrochemical capacitors A1 to A9, the oxidative decomposition of the lactone compound in the positive electrode is further suppressed. In addition, the pyrrolidinium ion, which has high reduction resistance, suppresses reductive decomposition even when the negative electrode potential decreases. As a result, when the thickness ratio Rd is the same, electrochemical capacitors A1 to A9 have smaller absolute values of the resistance increase rate and the capacitance deterioration rate than those of electrochemical capacitors A10 to A12, and maintain higher float characteristics.

Figure 2:
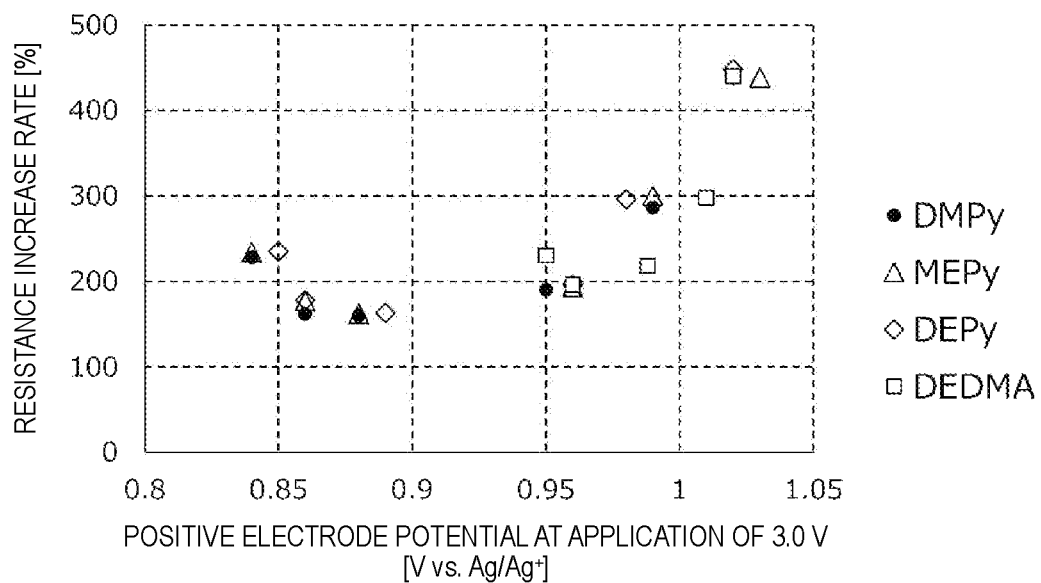
FIG. 2 is a graph plotting the resistance increase rate after a float test of an electrochemical capacitor with respect to the potential ($Ag/Ag^+$ reference electrode basis) of a positive electrode at the time of charge at 3 V.
Figure 3:
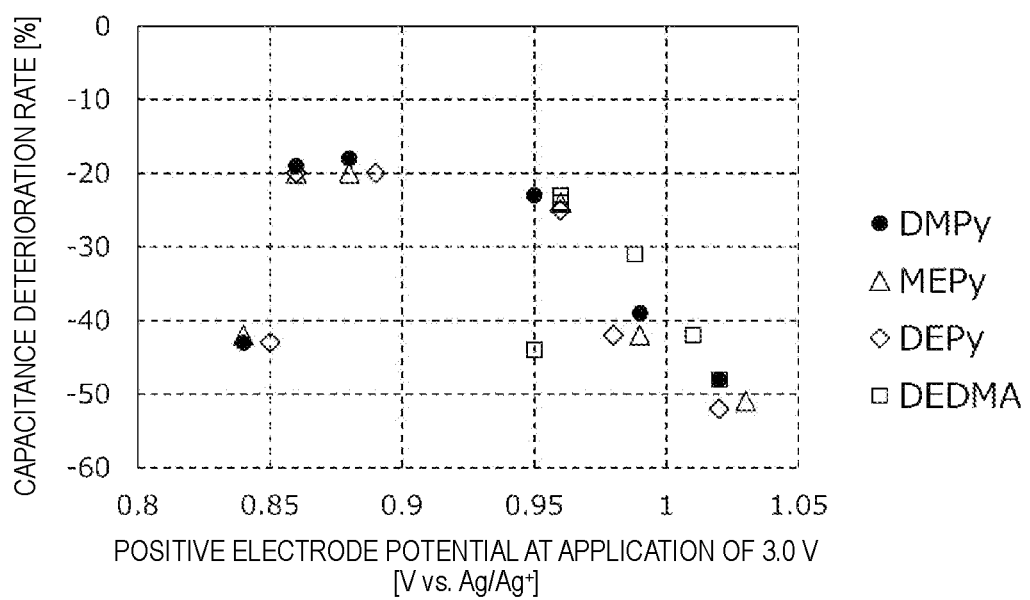
FIG. 3 is a graph plotting the capacitance deterioration rate after a float test of an electrochemical capacitor with respect to the potential ($Ag/Ag^+$ reference electrode basis) of a positive electrode at the time of charge at 3 V.

FIG. 2 shows a graph plotting the resistance increase rate of the electrochemical capacitor with respect to the positive electrode potential. FIG. 3 shows a graph plotting the capacitance deterioration rate of the electrochemical capacitor with respect to the positive electrode potential. FIGS. 2 and 3 reveal that when the positive electrode potential is in the range from +0.86 V to +0.96 V, inclusive, with respect to the potential of an Ag/Ag$^+$ reference electrode, the absolute values of the resistance increase rate and the capacitance deterioration rate can be further reduced, and the float characteristics can be further maintained high.

The electrochemical capacitor according to the present invention is suitably used for applications requiring a large capacitance and excellent float characteristics.

The invention claimed is:

1. An electrochemical capacitor comprising:
a positive electrode;
a negative electrode;
a separator disposed between the positive electrode and the negative electrode; and
an electrolytic solution, wherein:
the electrolytic solution contains a lactone compound,
a capacity of the positive electrode is more than 1.1 times a capacity of the negative electrode and is less than or equal to 1.6 times the capacity of the negative electrode, and
the electrolytic solution contains a pyrrolidinium ion.

2. The electrochemical capacitor according to claim 1, wherein the capacity of the positive electrode is more than or equal to 1.5 times and less than or equal to 1.6 times the capacity of the negative electrode.

3. The electrochemical capacitor according to claim 1, wherein:
each of the positive electrode and the negative electrode has a polarizable electrode layer disposed on a current collector, and
a thickness of the polarizable electrode layer of the positive electrode is more than 1.1 times and less than or equal to 1.6 times a thickness of the polarizable electrode layer of the negative electrode.

4. The electrochemical capacitor according to claim 3, wherein the thickness of the polarizable electrode layer of the positive electrode is more than or equal to 1.5 times and less than or equal to 1.6 times the thickness of the polarizable electrode layer of the negative electrode.

5. The electrochemical capacitor according to claim 3, wherein the polarizable electrode layer of the negative electrode contains styrene-butadiene rubber.

6. The electrochemical capacitor according to claim 1, wherein the pyrrolidinium ion includes one of N,N-dimethylpyrrolidinium (DMPy), N-methyl-N-ethylpyrrolidinium (MEPy), or N,N-diethylpyrrolidinium (DEPy).

7. The electrochemical capacitor according to claim 1, wherein the lactone compound includes γ-butyrolactone.

8. The electrochemical capacitor according to claim 1, wherein a potential of the positive electrode charged at 3 V is more than or equal to +0.86 V and less than or equal to +0.96 V with respect to a potential of an Ag/Ag$^+$ reference electrode.

* * * * *